United States Patent
Wang et al.

(10) Patent No.: US 10,565,803 B2
(45) Date of Patent: Feb. 18, 2020

(54) METHODS AND APPARATUSES FOR DETERMINING POSITIONS OF MULTI-DIRECTIONAL IMAGE CAPTURE APPARATUSES

(71) Applicant: Nokia Technologies Oy, Espoo (FI)

(72) Inventors: Tinghuai Wang, Tampere (FI); Yu You, Kangasala (FI); Lixin Fan, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/948,012

(22) Filed: Apr. 9, 2018

(65) Prior Publication Data

US 2018/0293805 A1 Oct. 11, 2018

(30) Foreign Application Priority Data

Apr. 11, 2017 (GB) .................................. 1705828.0

(51) Int. Cl.
*G06T 19/20* (2011.01)
*G03B 37/04* (2006.01)
*H04N 13/243* (2018.01)
*H04N 5/232* (2006.01)
*H04N 5/225* (2006.01)

(52) U.S. Cl.
CPC .............. *G06T 19/20* (2013.01); *G03B 37/04* (2013.01); *H04N 5/2259* (2013.01); *H04N 5/23238* (2013.01); *H04N 13/243* (2018.05)

(58) Field of Classification Search
CPC ..... G03B 37/04; G06T 19/20; H04N 5/23238
See application file for complete search history.

(56) References Cited

U.S. PATENT DOCUMENTS

| 7,463,280 | B2 | 12/2008 | Steuart, III |
| 9,047,706 | B1 * | 6/2015 | Ogale ...................... G06T 19/20 |
| 2001/0043738 | A1 * | 11/2001 | Sawhney ................ G01S 5/163 |
| | | | 382/154 |

(Continued)

FOREIGN PATENT DOCUMENTS

GB 2533788 A 7/2016

OTHER PUBLICATIONS

GB Non Provisional Application No. 1620312.7, "Methods and Apparatuses for Determining Positions of Multi-Directional Image Capture Apparatuses", filed on Nov. 30, 2016, 29 pages.

(Continued)

*Primary Examiner* — Mainul Hasan
(74) *Attorney, Agent, or Firm* — Harrington & Smith (57) ABSTRACT

A method comprising performing image re-projection on each of a plurality of first images of a scene, thereby to generate a plurality of re-projected second images of the scene, wherein each first image of the scene is captured by a respective camera of a first multi-directional image capture apparatus and each second image of the scene is associated with a respective virtual camera; processing the plurality of second images based on a previously generated virtual three dimensional model of the scene, thereby to generate respective positions of the virtual cameras associated with the second images; and determining a position of the first multi-directional image capture apparatus based on one or more of the generated positions of the virtual cameras.

17 Claims, 7 Drawing Sheets

(56) References Cited

U.S. PATENT DOCUMENTS

| | | | |
|---|---|---|---|
| 2004/0247174 A1 | 12/2004 | Lyons et al. | |
| 2010/0232727 A1* | 9/2010 | Engedal | H04N 13/204 382/285 |
| 2014/0340427 A1* | 11/2014 | Baker | G06T 3/0062 345/641 |
| 2015/0154806 A1 | 6/2015 | Ogale | |
| 2015/0237330 A1 | 8/2015 | Jang | |
| 2016/0182903 A1 | 6/2016 | Grundhofer | |

OTHER PUBLICATIONS

GB Non Provisional Application No. 1702680.8, "Methods and Apparatuses for Determining Positions of Multi-Directional Image Capture Apparatuses", filed on Feb. 20, 2017, 27 pages.

"Conversion Between Quaternions and Euler Angles", Wikipedia, Retrieved on Mar. 20, 2018, Webpage available at : https://en.wikipedia.org/wiki/Conversion_between_quaternions_and_Euler_angles.

"Accurate 360° Spherical Imaging With Multiple Pre-Calibrated Sensors", FLIR, Retrieved on Mar. 20, 2018, Nebpage available at : https://www.ptgrey.com/Whitepaper/360-spherical-precalibrated-cameras.

"New Centimeter-Accurate GPS System Could Transform Virtual Reality and Mobile Devices", Phys.Org, Retrieved on Mar. 20, 2018, Webpage available at : https://phys.org/news/2015-05-centimeter-accurate-gps-virtual-reality-mobile.html.

"GPS Tracking Down to the Centimeter", Phys.Org, Retrieved on Mar. 20, 2018, Webpage available at : https://phys.org/news/2016-02-gps-tracking-centimeter.html.

Taneja et al., "Registration of Spherical Panoramic Images with Cadastral 3D Models", Second International Conference on 3D Imaging, Modeling, Processing, Visualization & Transmission, Oct. 13-15, 2012, pp. 479-486.

"Giroptic 360cam", Wayback Machine, Retrieved on Apr. 9, 2018, Webpage available at : https://web.archive.org/web/20170606172111/https://www.giroptic.com/intl/en/.

Search Report received for corresponding United Kingdom Patent Application No. 1705828.0, dated Sep. 14, 2017, 4 pages.

* cited by examiner

METHODS AND APPARATUSES FOR DETERMINING POSITIONS OF MULTI-DIRECTIONAL IMAGE CAPTURE APPARATUSES

TECHNICAL FIELD

The present specification relates to methods and apparatuses for determining positions of multi-directional image capture apparatuses.

BACKGROUND

Camera pose registration is an important technique used to determine positions and orientations of image capture apparatuses such as cameras. The recent advent of commercial multi-directional image capture apparatuses, such as 360° camera systems, brings new challenges with regard to the performance of camera pose registration in a reliable, accurate and efficient manner.

Summary

According to a first aspect, this specification describes a method comprising performing image re-projection on each of a plurality of first images of a scene, thereby to generate a plurality of re-projected second images of the scene, wherein each first image of the scene is captured by a respective camera of a first multi-directional image capture apparatus and each second image of the scene is associated with a respective virtual camera; processing the plurality of second images based on a previously generated virtual three dimensional model of the scene, thereby to generate respective positions of the virtual cameras associated with the second images; and determining a position of the first multi-directional image capture apparatus based on one or more of the generated positions of the virtual cameras.

The method of the first aspect may further comprise updating the previously generated virtual three dimensional model with the determined position of the multi-directional image capture apparatus.

The virtual three dimensional model may comprise information describing features of the scene.

The previously generated three dimensional model may have been generated based at least in part on images previously captured by the first multi-directional image capture apparatus.

The previously generated three dimensional model may have been generated based at least in part on images previously captured by a set of one or more multi-directional image capture apparatuses which does not include the first multi-directional image capture apparatus.

Processing the plurality of second images based on the virtual three dimensional model may comprise determining point correspondences between the second images and the virtual three dimensional model, and performing a Direct Linear Transform based on the determined point correspondences to determine positions of each of the virtual cameras.

Determining the position of the multi-directional image capture apparatus based on the generated positions of the virtual cameras may comprise determining a position of a camera of the multi-directional image capture apparatus based on one or more of the generated positions of the virtual cameras, and determining the position of the multi-directional image capture apparatus based on the determined position of the camera.

Determining the position of the multi-directional image capture apparatus based on one or more of the generated positions of the virtual cameras may comprise determining outliers and inliers in the generated positions of the virtual cameras, and determining the position of the multi-directional image capture apparatus based only on the inliers.

Determining the position of the multi-directional image capture apparatus based on one or more of the generated positions of the virtual cameras may further comprise determining the virtual camera having the smallest re-projection error associated therewith, and determining the position of the multi-directional image capture apparatus based only on the position of the virtual camera having the smallest re-projection error associated therewith.

Processing of the plurality of second images may further generate respective orientations of the virtual cameras, and the method of the first aspect may further comprise determining an orientation of the multi-directional image capture apparatus based on one or more of the generated orientations of the virtual cameras.

The position of the multi-directional image capture apparatus may be determined based on both the one or more generated positions of the virtual cameras and the one or more generated orientations of the virtual cameras.

According to a second aspect this specification describes apparatus configured to perform any method described with reference to the first aspect.

According to a third aspect, this specification describes computer-readable instructions which, when executed by computing apparatus, cause the computing apparatus to perform any method described with reference to the first aspect.

According to a fourth aspect, this specification describes apparatus comprising at least one processor, and at least one memory including computer program code, which when executed by the at least one processor, causes the apparatus to: perform image re-projection on each of a plurality of first images of a scene, thereby to generate a plurality of re-projected second images of the scene, wherein each first image of the scene is captured by a respective camera of a first multi-directional image capture apparatus and each second image of the scene is associated with a respective virtual camera; process the plurality of second images based on a previously generated virtual three dimensional model of the scene, thereby to generate respective positions of the virtual cameras associated with the second images; and determine a position of the first multi-directional image capture apparatus based on one or more of the generated positions of the virtual cameras.

The computer program code, when executed by the at least one processor, may further cause the apparatus to: update the previously generated virtual three dimensional model with the determined position of the multi-directional image capture apparatus.

The virtual three dimensional model may comprise information describing features of the scene.

The previously generated three dimensional model may have been generated based at least in part on images previously captured by the first multi-directional image capture apparatus.

The previously generated three dimensional model may have been generated based at least in part on images previously captured by a set of one or more multi-directional image capture apparatuses which does not include the first multi-directional image capture apparatus.

Processing the plurality of second images based on the virtual three dimensional model may comprise determining point correspondences between the second images and the virtual three dimensional model, and performing a Direct Linear Transform based on the determined point correspondences to determine positions of each of the virtual cameras.

Determining the position of the multi-directional image capture apparatus based on the generated positions of the virtual cameras may comprise determining a position of a camera of the multi-directional image capture apparatus based on one or more of the generated positions of the virtual cameras, and determining the position of the multi-directional image capture apparatus based on the determined position of the camera.

Determining the position of the multi-directional image capture apparatus based on one or more of the generated positions of the virtual cameras may comprise determining outliers and inliers in the generated positions of the virtual cameras, and determining the position of the multi-directional image capture apparatus based only on the inliers.

Determining the position of the multi-directional image capture apparatus based on one or more of the generated positions of the virtual cameras may further comprise determining the virtual camera having the smallest re-projection error associated therewith, and determining the position of the multi-directional image capture apparatus based only on the position of the virtual camera having the smallest re-projection error associated therewith.

Processing of the plurality of second images may further generate respective orientations of the virtual cameras, and the computer program code, when executed by the at least one processor, may further cause the apparatus to determining an orientation of the multi-directional image capture apparatus based on one or more of the generated orientations of the virtual cameras.

The position of the multi-directional image capture apparatus may be determined based on both the one or more generated positions of the virtual cameras and the one or more generated orientations of the virtual cameras.

According to a fifth aspect, this specification describes a computer-readable medium having computer-readable code stored thereon, the computer readable code, when executed by at least one processor, causes performance of: performing image re-projection on each of a plurality of first images of a scene, thereby to generate a plurality of re-projected second images of the scene, wherein each first image of the scene is captured by a respective camera of a first multi-directional image capture apparatus and each second image of the scene is associated with a respective virtual camera; processing the plurality of second images based on a previously generated virtual three dimensional model of the scene, thereby to generate respective positions of the virtual cameras associated with the second images; and determining a position of the first multi-directional image capture apparatus based on one or more of the generated positions of the virtual cameras.

The computer-readable code stored on the medium of the fifth aspect may further cause performance of any of the operations described with reference to the method of the first aspect.

According to a sixth aspect, this specification describes apparatus comprising means for performing image re-projection on each of a plurality of first images of a scene, thereby to generate a plurality of re-projected second images of the scene, wherein each first image of the scene is captured by a respective camera of a first multi-directional image capture apparatus and each second image of the scene is associated with a respective virtual camera; means for processing the plurality of second images based on a previously generated virtual three dimensional model of the scene, thereby to generate respective positions of the virtual cameras associated with the second images; and means for determining a position of the first multi-directional image capture apparatus based on one or more of the generated positions of the virtual cameras.

The apparatus of the sixth aspect may further comprise means for causing performance of any of the operations described with reference to the method of the first aspect.

BRIEF DESCRIPTION OF THE DRAWINGS

For a more complete understanding of the methods, apparatuses and computer-readable instructions described herein, reference is now made to the following description taken in connection with the accompanying drawings, in which.

DETAILED DESCRIPTION

In the description and drawings, like reference numerals may refer to like elements throughout.

Figure 1:
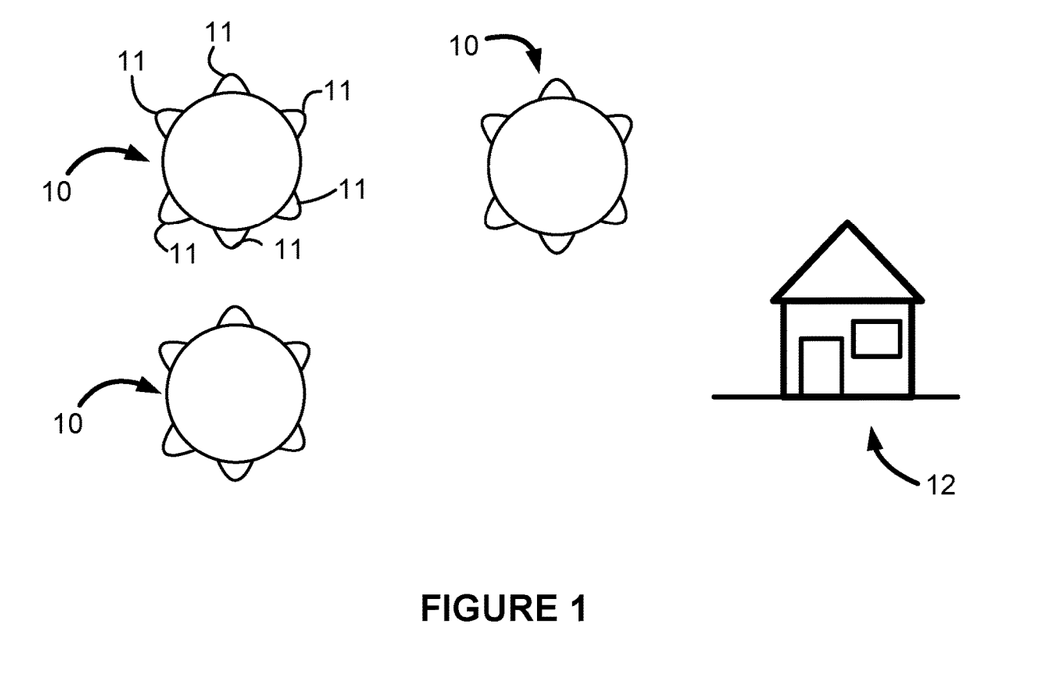
FIG. 1 illustrates an example of multiple multi-directional image capture apparatuses in an environment.

FIG. 1 illustrates a plurality of multi-directional image capture apparatuses 10 located within an environment.

The multi-directional image capture apparatuses 10 may, in general, be any apparatus capable of capturing images of a scene 12 from multiple different perspectives simultaneously. For example, a multi-directional image capture apparatus 10 may be a 360° camera system (also known as an omnidirectional camera system or a spherical camera system). However, it will be appreciated that a multi-directional image capture apparatus 10 does not necessarily have to have full angular coverage of its surroundings and may only cover a smaller field of view.

The term "image" used herein may refer generally to visual content. This may be visual content which is captured by a multi-directional image capture apparatus 10, or visual content which is derived from visual content captured by a multi-directional image capture apparatus 10. For example, an image may be a single frame of a video.

As illustrated in FIG. 1, each multi-directional image capture apparatus 10 may comprise a plurality of cameras 11. The term "camera" used herein may refer to a sub-part of a multi-directional image capture apparatus 10 which performs the capturing of images.

As illustrated, each of the plurality of cameras 11 of a multi-directional image capture apparatus 10 may be facing a different direction to each of the other cameras 11 of the multi-directional image capture apparatus 10. As such, each camera 11 of a multi-directional image capture apparatus 10 may have a different field of view, thus allowing the multi-directional image capture apparatus 10 to capture images of the scene 12 from different perspectives simultaneously. The fields of view of the different cameras 11 may be partially overlapping.

Similarly, as illustrated in FIG. 1, each multi-directional image capture apparatus 10 may be at a different location to each of the other multi-directional image capture apparatuses 10. Thus, each of the plurality of multi-directional image capture apparatuses 10 may capture images of the scene 12 (via their cameras 11) from different perspectives simultaneously. In this way, the multi-directional image capture apparatuses 10 may be used for a number of different functions. For example, they may be used for functions such as live event broadcasting, video conferencing and virtual reality tourism.

In the example scenario illustrated by FIG. 1, it is possible to perform camera pose registration in order to determine the position and/or orientation of each of the multi-directional image capture apparatuses 10 within the environment. In particular, it is possible to determine these positions and/or orientations relative to a particular reference coordinate system, which allows the overall arrangement of the multi-directional image capture apparatuses 10 relative to each other to be determined.

One way of performing camera pose registration is to use a computer vision method. For example, structure from motion (SfM) analysis may be used. SfM is a known technique which is used to estimate three dimensional (3D) structures from two dimensional (2D) images. Broadly speaking, SfM works by determining point correspondences between images (also known as feature matching) and calculating positions and orientations of various features based on the determined point correspondences.

SfM analysis is also capable of outputting the positions and/or orientations of each of the cameras that are associated with the images, which can then be used to determine the position and/or orientation of each of the multi-directional image capture apparatuses 10. Such methods for performing camera pose registration are described in UK patent applications GB1620312.7 and GB1702680.8, which are hereby incorporated by reference. As such, by using SfM analysis on images captured by the multi-directional image capture apparatuses 10, it is possible to generate a virtual 3D model of the scene 12.

A virtual 3D model of the scene 12 may be a set of information describing various features of the scene 12. The virtual 3D model may, for example, include information describing one or more of the positions, orientations and pixel values of various features in the scene 12. The position and orientation information may be relative to a particular reference co-ordinate system. The virtual 3D model may also include information indicating correspondences between 3D voxels of the virtual 3D model and 2D pixels in the images from which the virtual 3D model is generated. It will be appreciated that at least some of the information contained in the virtual 3D model may be visually represented by a point cloud.

In some examples, information describing the positions and/or orientations of the multi-directional image capture apparatuses 10 (obtained, for example, from the SfM analysis described above) may be stored in a dedicated position and orientation database. Alternatively, this information may be included in the virtual 3D model.

Figure 2A:
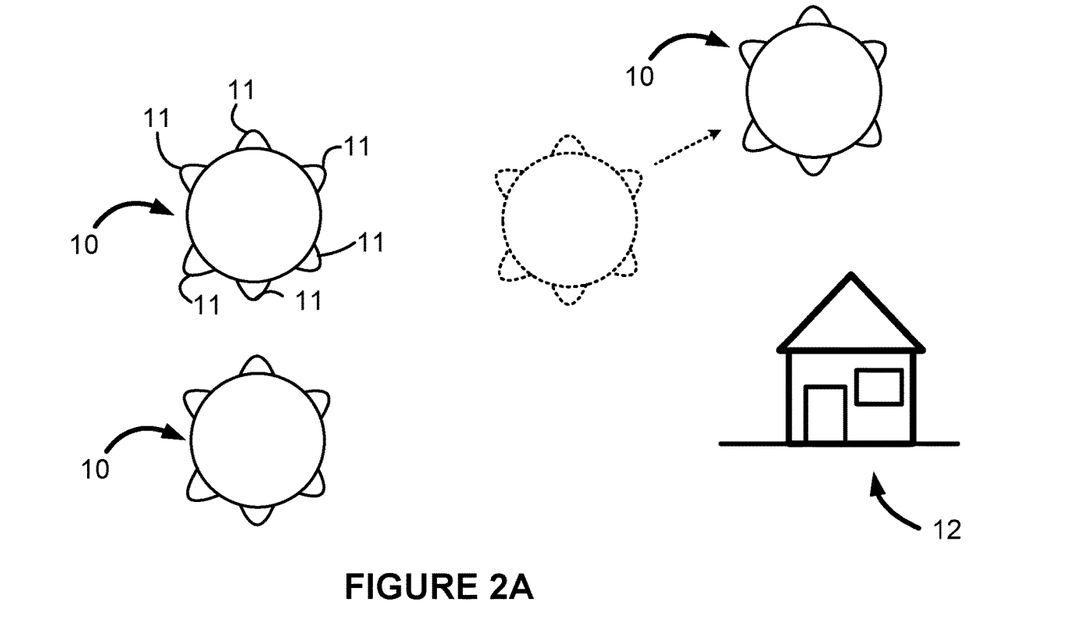
FIG. 2A and 2B illustrate examples of changes in the arrangement of FIG. 1.
Figure 2B:
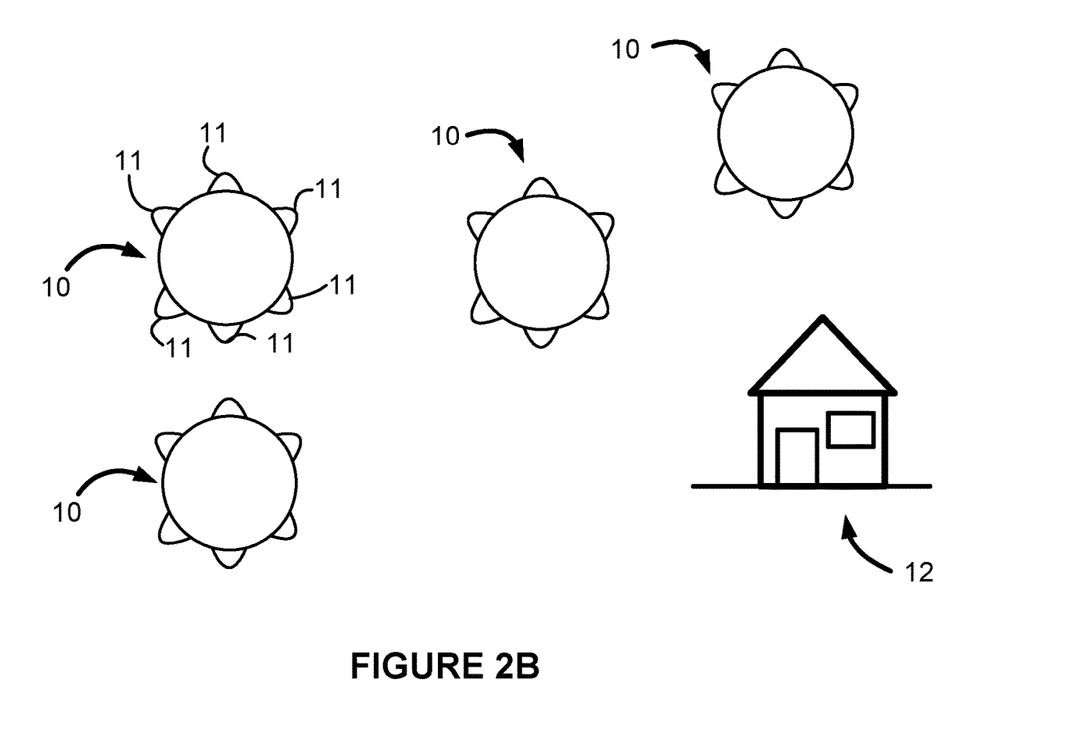

After the camera pose registration and the generation of a virtual 3D model as described above, the arrangement of the multi-directional image capture apparatuses 10 within the environment illustrated by FIG. 1 may change with time. For example, as illustrated by FIG. 2A, one of the multi-directional image capture apparatuses 10 in the arrangement may be moved to a new position and/or orientation. In another example, as illustrated by FIG. 2B, a new multi-directional image capture apparatus 10 may be added to the arrangement. For instance, if the multi-directional image capture apparatuses 10 are being used for live broadcasting of a live stage event, then one of the multi-directional image capture apparatuses 10 may be moved to follow a dancer or singer on the stage, while the other multi-directional image capture apparatuses 10 may be kept stationary to monitor the stage as a whole. Similarly, a new multi-directional image capture apparatus 10 may be added to monitor the live stage event.

In the scenario of FIG. 2A, it may be desirable to determine the new position and/or orientation of the multi-directional image capture apparatus 10 which has been moved. Similarly, in the scenario of FIG. 2B, it may be desirable to determine the position and/or orientation of the newly added multi-directional image capture apparatus 10.

One way of determining the position and/or orientation of the moved multi-directional image capture apparatus 10 of FIG. 2A or the new multi-directional image capture apparatus 10 of FIG. 2B is to perform the above-mentioned SfM analysis again using new images captured by the multi-directional image capture apparatuses 10. However, this approach may be time consuming, computationally intensive and error-prone.

A method for performing camera pose registration which may address some or all of the challenges mentioned above will now be described.

Figure 3:
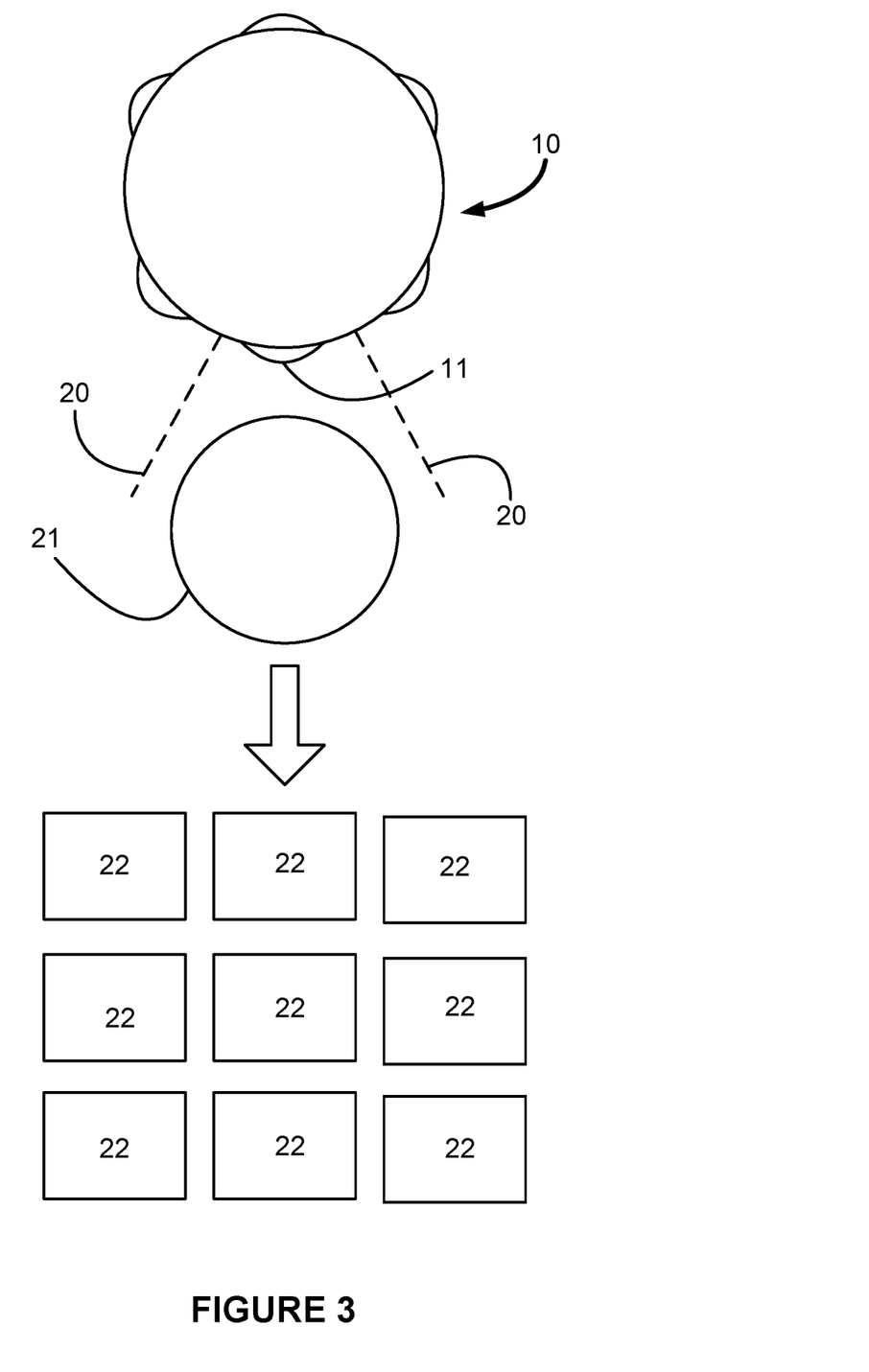
FIG. 3 illustrates an example of processing of an image captured by a multi-directional image capture apparatus to generate re-projected images.

FIG. 3 illustrates a multi-directional image capture apparatus 10 for which camera pose registration is desired. For example, this multi-directional image capture apparatus 10 may be the multi-directional image capture apparatus 10 which has been moved in FIG. 2A or the newly added multi-directional image capture apparatus 10 in FIG. 2B.

A camera 11 of the multi-directional image capture apparatus 10 may capture a first image 21. The first image 21 may be an image of the scene within the field of view 20 of the camera 11. In some examples, the lens of the camera 11 may be a fish-eye lens and so the first image 21 may be a fish-eye image (in which the camera field of view is enlarged). However, the method described herein may be applicable for use with lenses and resulting images of other types. For example, the camera pose registration method described herein may also be applicable to images captured by a camera with a hyperbolic mirror in which the camera optical centre coincides with the focus of the hyperbola, and images captured by a camera with a parabolic mirror and an orthographic lens in which all reflected rays are parallel to the mirror axis and the orthographic lens is used to provide a focused image.

The first image 21 may be processed to generate one or more second images 22. More specifically, image re-projection may be performed on the first image 21 to generate one or more re-projected second images 22. For example, if the first image 21 is not a rectilinear image (e.g. it is a fish-eye image), it may be re-projected to generate one or more second images 22 which are rectilinear images (as illustrated by FIG. 3). Each generated second image 22 may at least partially represent a different portion of the first image 21. It will be appreciated that, in general, the re-projection may generate any type of second image 22, as long as the image type is compatible with the algorithm used to analyse the re-projected images.

Each re-projected second image 22 may be associated with a respective virtual camera. A virtual camera is an imaginary camera which does not physically exist, but which corresponds to a camera which would have captured the re-projected second image 22 with which it is associated. A virtual camera is defined by virtual camera parameters which represent the configuration of the virtual camera required in order to have captured to the respective second image 22. As such, for the purposes of the methods and operations described herein, a virtual camera can be treated as a real physical camera. For example, each virtual camera has, among other virtual camera parameters, a position and orientation which can be determined.

When a plurality of re-projected second images 22 are generated (e.g. FIG. 3 illustrates nine re-projected second images 22 being generated), each re-projected second image 22 may have a different viewing direction compared to each of the other second images 22. In other words, the virtual camera of each second image 22 may have a different orientation compared to each of the other virtual cameras. Similarly, the orientation of each of the virtual cameras may also be different to the orientation of the real camera 11 which captured the first image 21. Furthermore, each virtual camera may have a smaller field of view than the real camera 11 as a result of the re-projection. The virtual cameras may have overlapping fields of view with each other.

The orientations of the virtual cameras may be pre-set. In other words, the re-projection of the first image 21 may generate second images 22 with associated virtual cameras which each have a certain pre-set orientation relative to the orientation of the real camera 11. For example, the orientation of each virtual camera may be pre-set such that it has certain yaw, pitch and roll angles relative to the real camera 11.

It will be appreciated that, in general, any number of second images 22 may be generated.

It will also be appreciated that the first images 21 may correspond to images of the scene at a particular moment in time. For example, if the multi-directional image capture apparatus 10 is capturing video images, a first image 21 may correspond to a single video frame of a single camera 11, and all of the first images 21 may be video frames that are captured at the same moment in time.

Figure 4A:
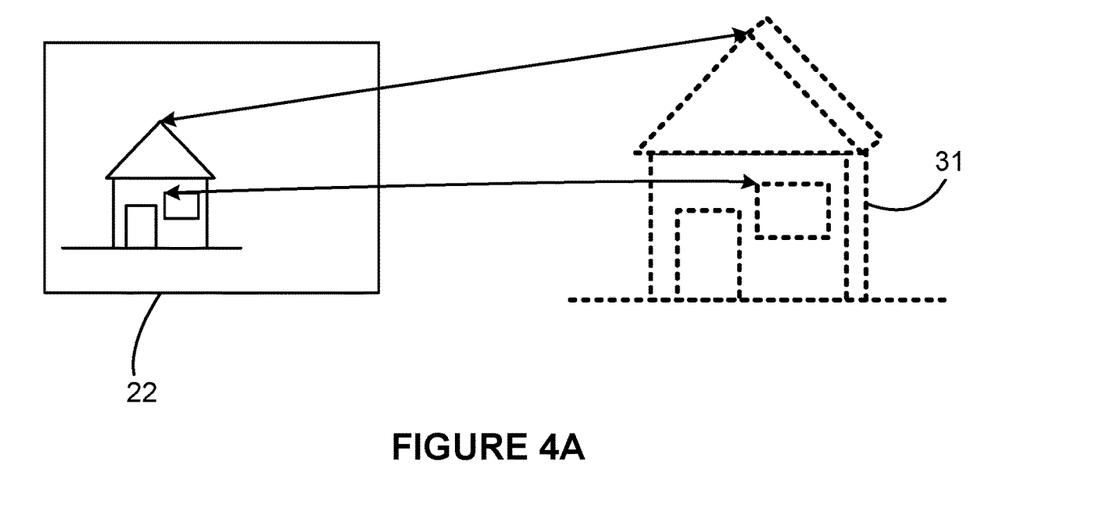
FIG. 4A illustrates an example of processing a re-projected image based on a virtual three dimensional model.
Figure 5A:
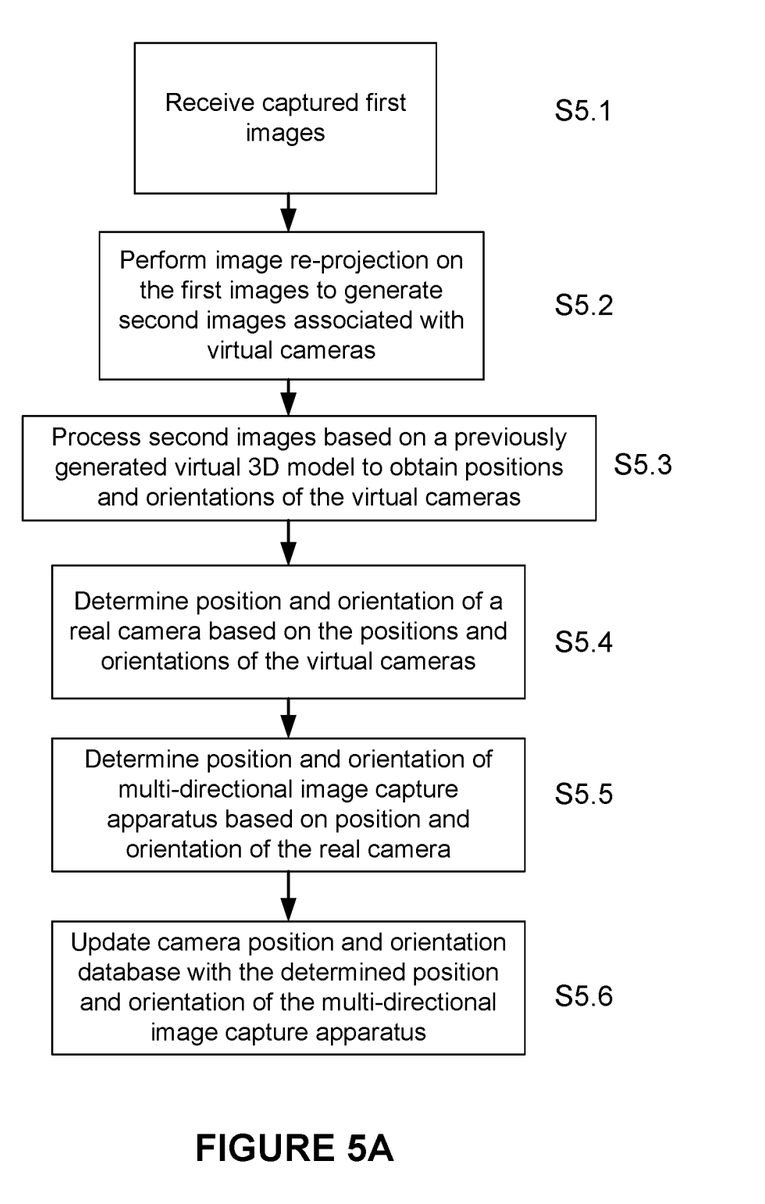
FIGS. 5A and 5B are flowcharts illustrating examples of various operations which may be performed based on images captured by one or more multi-directional image capture apparatuses.
Figure 5B:
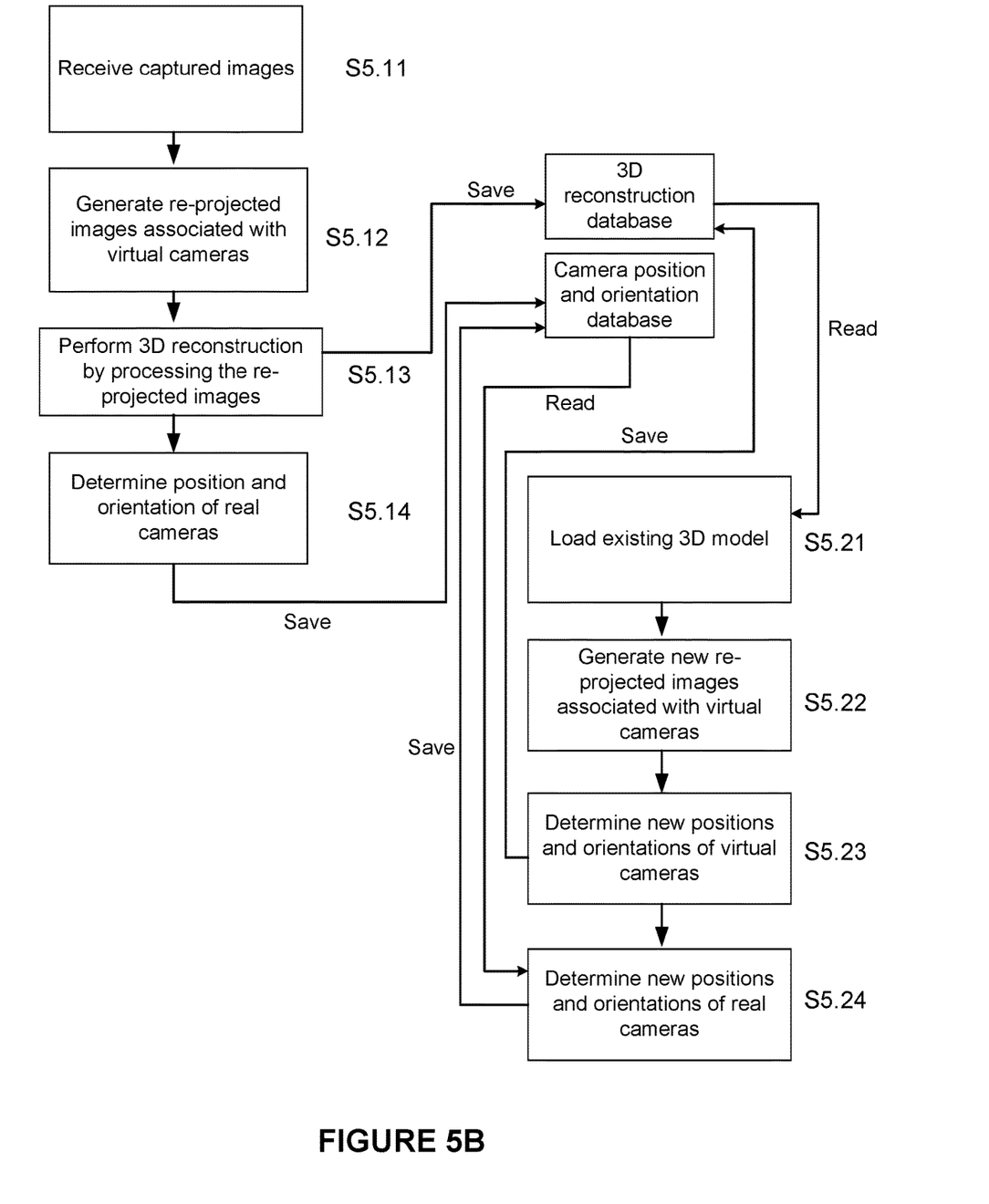

Having generated the second images 22, these images can then be processed based on a previously generated virtual 3D model of the scene, which may be retrieved from a 3D reconstruction database (see FIG. 5B). In particular, as illustrated by FIG. 4A, a second image 22 may be processed based on a previously generated virtual 3D model by determining point correspondences between the second image 22 and the virtual 3D model. For instance, as illustrated by FIG. 4A, correspondences between points in a second image 22 and points on an object 31 in the virtual 3D model may be determined.

Following the determination of point correspondences, a Direct Linear Transform may be performed based on the determined point correspondences to determine the position and/or orientation of the virtual camera associated with each second image 22. More specifically, a Perspective-n-Point (PnP) problem may be solved to determine the position and/or orientation of each virtual camera. It will be appreciated that for PnP problems, the intrinsic camera parameters (such as focal length and principle point) may be known.

The position and/or orientation of each virtual camera may be determined by solving the following equation:

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

In the above equation, $f_x$ and $f_y$ are the focal lengths of the virtual camera along x and y axes, $c_x$ and $c_y$ are x and y coordinates of the principal point of the virtual camera, $r_{11}$ to $r_{33}$ are terms representing the orientation of the virtual camera, $t_1$ to $t_3$ are terms representing the position of the virtual camera, X, Y, Z are the coordinates of a 3D point in the virtual 3D model, u and v are the homogeneous coordinates of a 2D point in the second image 22 corresponding to the 3D point, and s is a uniform scaling factor.

In more detail, the above equation may be solved by multiplying out the matrices and vectors for a plurality of point correspondences to obtain a set of simultaneous equations, which can then be solved to obtain values for $r_{11}$ to $r_{33}$ and $t_1$ to $t_3$. It will be appreciated that since position and orientation together represent six degrees of freedom, a minimum of six point correspondences may be needed to determine the position and orientation of each virtual camera.

Following the determination of the position and/or orientation of each of the virtual cameras (for example, for the multi-directional image capture apparatus 10 illustrated by FIG. 3, the positions and/or orientations of nine virtual cameras may be determined for each of the real cameras 11 of the multi-directional image capture apparatus 10), the position and/or orientation of each of the real cameras 11 may be determined based on the positions and/or orientations of the virtual cameras.

One way of determining the position and/or orientation of a real camera 11 is to simply take the position and/or orientation of one of the virtual cameras associated with the real camera 11 as being the position and/or orientation of the real camera 11. The virtual camera chosen for this purpose may be a virtual camera whose orientation is presumed to be the same as the orientation of the real camera 11. For example, for the nine virtual cameras associated with the nine second images 22 of FIG. 3, the position and/or orientation of the virtual camera associated with the central second image 22 may be taken to be the position and/or orientation of the real camera 11 (since the orientation of the central camera in this example may be closest to the orientation of the real camera 11). It will be appreciated that any one of the virtual cameras corresponding to the real camera 11 can be chosen for this purpose (e.g. in the example of FIG. 3, any of the nine virtual cameras may be chosen). This approach can be used because there may be relatively low error associated with performing point correspondence with a virtual 3D model due to the relatively high amount of information contained within the 3D model. Therefore, the determined position and/or orientation of one of the virtual cameras may be a relatively accurate representation of the position and/or orientation of its associated real camera 11.

Alternatively, it may still be desirable to further reduce error, since the determined positions and/or orientations may still have a certain degree of error associated with them due to the spatial distribution of the 3D points used and the limited field of view of the virtual cameras. One way of doing this is to determine outliers and inliers in the generated positions of the virtual cameras, and then determining the position of the real camera 11 based only on the inliers. This may be performed in the following way for a multi-directional image capture apparatus which has been moved (for example, as illustrated by FIG. 2A).

Figure 4B:
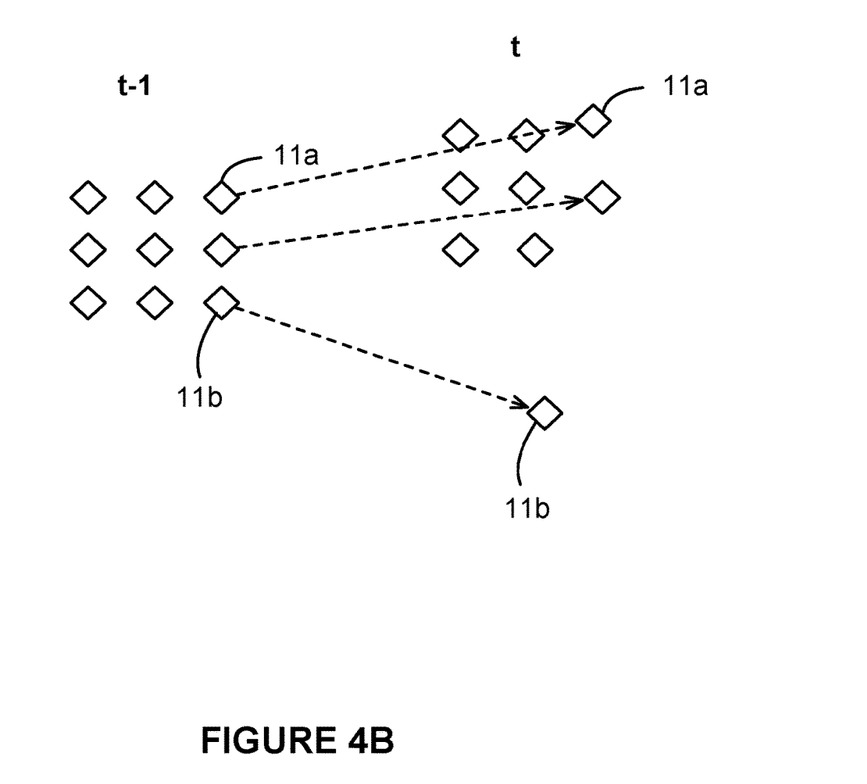
FIG. 4B illustrates the determination of inliers and outliers in relative positions of virtual cameras.

Referring to FIG. 4B, first, the known previous position of each of the virtual cameras (represented by diamond shapes of FIG. 4B) of the multi-directional image capture apparatus is determined. The previous position may be the position at a previous time (t−1). This may be achieved by determining an offset vector between the position of the multi-directional image capture apparatus and the position of each of its virtual cameras, the offset vector being relative to a reference co-ordinate system. The offset vector relative to the reference co-ordinate system may be determined according to:

$$v_{ldev}^{w}(t-1) = R_{dev}(t-1) \cdot v_{ldev}$$

where $v^{w}_{ldev}(t-1)$ is the offset vector relative to the reference co-ordinate system at time t−1, $R_{dev}(t-1)$ is a rotation matrix representing the orientation of the multi-directional image capture apparatus at time t−1, and $V_{ldev}$ is the offset vector between the position of the multi-directional image capture apparatus and the position of the virtual camera relative to a local co-ordinate system of the multi-directional image capture apparatus.

The positions of each of the virtual cameras of the multi-directional image capture apparatus at time (t−1) may then be determined according to:

$$c_l(t-1) = c_{dev} + v_{ldev}^{w}(t-1)$$

where $c_l(t-1)$ is the position of one of the virtual cameras of the multi-directional image capture apparatus at time t−1, and $c_{dev}$ is the position of the multi-directional image capture apparatus at time t−1.

Then, the relative translation between each virtual camera position at time t−1 (the previous time) and the corresponding position at time t (the current time) may be determined to obtain a set of relative translations. Median absolute deviation analysis may then be performed on the set of relative translations to determine outlier and inliers. This may be performed according to:

$$d_i = |S_i - \text{Median}(S)|, \forall S_i \in S$$
$$d_\sigma = \text{Median}(\{d_0, \ldots, d_N\})$$
$$\text{inliers} = \frac{d_i}{d_\sigma} < m, \forall i \in N$$

where S is the set of relative translations of virtual cameras corresponding to one real camera, $d_i$ is a measure of the difference between a relative translation and the median of all relative translations, $d_\sigma$ is the median absolute deviation (MAD), m is a threshold value below which a relative translation is considered an inlier (for example, m may be set to be 2).

In this way, as illustrated by FIG. 4B, a virtual camera 11a which does not deviate from the collective pattern between time t−1 and t is considered an inlier, and a virtual camera 11b which does deviate from the collective pattern between t−1 and t is considered an outlier. By using only the inliers in further analysis, temporal consistency may be improved.

Following the above inlier and outlier determination, one of the remaining inlier virtual cameras may be chosen based on the re-projection errors associated with the virtual cameras. The re-projection error is an error which may be output by the algorithm which is used to determine point correspondences between the virtual 3D model and the second images. The re-projection error may be a measure of how well a 2D projection of a 3D point is geometrically aligned with a 2D feature. In order to improve geometric consistency, the virtual camera which corresponds to a real camera having the smallest re-projection error associated therewith may be determined from the remaining inlier virtual cameras.

After filtering by enforcing both temporal and geometric consistencies as described above, the position of the virtual camera having the smallest re-projection error may be taken to be the position of its respective real camera (this may be referred to as a "winner takes all approach").

The orientation of the real camera can be determined from the selected virtual camera according to:

$$R_l = R_v R_{vl}^{-1}$$

where the rotation matrix of a real camera ($R_l$) may be determined by multiplying the rotation matrix of a virtual camera ($R_v$) onto the inverse of the rotation matrix representing the orientation of the virtual camera relative to the orientation of the real camera ($R_{vl}^{-1}$).

Once the position and/or orientation of the real camera has been determined, the position and/or orientation of the multi-directional image capture apparatus may be determined based on the position and/or orientation of the real camera. This may be done in the following way.

First, the orientation of the multi-directional image capture apparatus is determined according to:

$$R_{dev} = R_l R_{ldev}^{-1}$$

where $R_{dev}$ is a rotation matrix representing the orientation of the multi-directional image capture apparatus, $R_l$ is a rotation matrix representing the orientation of the real camera and $R_{ldev}^{-1}$ is the inverse of a rotation matrix representing the orientation of the real camera relative to the multi-directional image capture apparatus.

Put another way, the rotation matrix of a multi-directional image capture apparatus ($R_{dev}$) can be determined by multiplying the rotation matrix of the real camera ($R_l$) onto the inverse of the matrix representing the orientation of the real camera relative to the orientation of the multi-directional image capture apparatus ($R_{dev}^{-1}$).

It will be appreciated that the above described methods are not limited to a matrix representation of orientation. The orientation of the multi-directional image capture apparatus may also be calculated using Euler angle or quaternion representations of orientation. These representations are known in the art and will not be described in detail here.

It will be further appreciated that the above described process may be performed for each real camera 11 of the multi-directional image capture apparatus 10 to determine the position and/or orientation of each of the real cameras 11 of the multi-directional image capture apparatus 10.

The position of the multi-directional image capture apparatus 10 may then be determined in the following way. The position of the real camera relative to the multi-directional image capture apparatus 10 may be known, and may be represented by vector $v_{ldev}$. However, $v_{ldev}$ is relative to a local coordinate system of the multi-directional image capture apparatus. To obtain the position of the real camera 11 relative to the multi-directional image capture apparatus 10 (relative the reference coordinate system), $v_{ldev}$ may be rotated according to:

$$v_{ldev}^{w} = R_{dev} v_{ldev}$$

Where $R_{dev}$ is the final rotation matrix of the multi-directional image capture apparatus 10 as determined above, and $v^w_{Idev}$ is a vector representing the position of the real camera 11 relative to the multi-directional image capture apparatus 10 (and relative the reference coordinate system). As such, the position of the real camera 11 relative to its corresponding multi-directional image capture apparatus (relative the reference coordinate system) may be determined by multiplying the rotation matrix of the multi-directional image capture apparatus 10 onto the position of the real camera relative to the multi-directional image capture apparatus in the local coordinate system of the multi-directional image capture apparatus.

Therefore, the position of the multi-directional image capture apparatus 10 may be determined according to:

$$c_{dev} = c_I - v^w_{Idev}$$

Where $C_I$ represents the position vector of the real camera as determined above, $v^w_{Idev}$ represents the position of the real camera relative to the multi-directional image capture apparatus as determined above, and $c_{dev}$ is the position vector of the multi-directional image capture apparatus 10 in the reference coordinate system. Put another way, a position of the multi-directional image capture apparatus 10 may be determined by taking the difference between the position vector of the real camera 11 and the position vector of the real camera relative to the multi-directional image capture apparatus.

Finally, the determined position and/or orientation of the multi-directional image capture apparatus 10 may be saved in a camera position and orientation database (see FIG. 5B). The camera position and orientation database may include information describing the position and orientation each of the real cameras of the multi-directional image capture apparatuses and/or the position and orientation of the multi-directional image capture apparatuses themselves. In some examples, the information in the camera position and orientation database may instead be included in the 3D reconstruction database as part of the 3D model. In such examples, the 3D model may be said to be updated based on the determined position of the multi-directional image capture apparatus. In some examples, the 3D reconstruction database and/or the camera position and orientation database may be located at an external server or a computing device coupled with one or more of the multi-directional image capture apparatuses by a wireless or wired connection.

It will be appreciated that the above described methods may be repeated to determine future positions of the multi-directional image capture apparatus. It will also be appreciated that the above described methods may be performed for a plurality of multi-directional image capture apparatuses. For example, if more than one of the plurality of multi-directional image capture apparatuses 10 of FIG. 1 are moved then the above methods may be performed for all of the multi-directional image capture apparatuses which are moved. Similarly, if more than one multi-directional image capture apparatuses is added to the arrangement, then the above methods may be performed for all of the multi-directional image capture apparatuses added to the arrangement. As such, the positions and orientations of multi-directional image capture apparatuses in the arrangement may be kept up to date.

FIG. 5A is a flowchart showing examples of operations as described herein.

At operation 5.1, a plurality of first images 21 which are captured by a multi-directional image capture apparatus 10 may be received. For example, image data corresponding to the first images 21 may be received at computing apparatus 60 (see FIG. 6).

At operation 5.2, image re-projection may be performed on each of the first images 21 to obtain one or more re-projected second images 22 corresponding to respective virtual cameras.

At operation 5.3, the second images 22 may be processed based on a virtual 3D model to obtain positions and orientations of the virtual cameras. For example, the second images 22 may be processed using a Direct Linear Transform method.

At operation 5.4, positions and orientations of a real camera may be determined based on the positions and orientations of the virtual cameras determined at operation 5.3.

At operation 5.5, the position and orientation of the multi-directional image capture apparatus may be determined based on the position and orientation of the real camera determined at operation 5.4.

At operation 5.6, the camera position and orientation database may be updated with the position and orientation of the multi-directional image capture apparatus determined at operation 5.5.

It will be appreciated that the position of a real camera 11 as described herein may be the position of the centre of a lens of the real camera 11. Similarly, the position of a virtual camera may be the position of the centre of a virtual lens of the virtual camera. The position of the multi-directional image capture apparatus 10 may be the centre of the multi-directional image capture apparatus (e.g. if a multi-directional image capture apparatus is spherically shaped, its position may be defined as the geometric centre of the sphere).

FIG. 5B is a flowchart showing examples of operations and interactions between various functions and databases described herein.

Operations S5.11 to S5.14 relate to the initial determination of the positions and orientations of a plurality of multi-directional image capture apparatus, for example as described in UK patent applications GB1620312.7 and GB1702680.8.

At operation S5.11, images captured by a plurality of multi-directional image capture apparatus are received.

At operation S5.12, the capture images are processed to generated re-projected images associated with virtual cameras.

At operation 5.13, 3D reconstruction is performed by processing the re-projected images. This may be performed using a SfM technique, as described above. As such, a 3D model of the scene captured by the images may be obtained. As illustrated, information describing the scene from the 3D model may be saved to a 3D reconstruction database. Such information may include a 3D point cloud and/or information describing image features.

At operation 5.14, the position and orientation of the cameras of the multi-directional image capture apparatuses may be determined. As illustrated, this may be saved to a camera position and orientation database.

Operations S5.21 to S5.24 may be performed when the arrangement of the multi-directional image capture apparatuses changes as described above with reference to FIGS. 2A and 2B. In this situation, the position and orientation of the cameras of the multi-directional image capture apparatus which caused the change in arrangement (e.g. the one which has moved or the newly added one) may need to be determined.

At operation S5.21, the existing 3D model may be loaded. This may be the 3D model previously generated and saved as a result of operations 5.11 to 5.13. As illustrated, this may be performed by reading the necessary information from the 3D reconstruction database.

At operation S5.22, the multi-directional image capture apparatus may generate new re-projected images associated with virtual cameras based on new images captured by the multi-directional image capture apparatus which caused the change in arrangement. This operation may be performed in the same or a similar way to operation S5.2 of FIG. 5A.

At operation S5.23, the new position and orientation of the virtual cameras may be determined. This operation may be performed in the same or a similar way to operation S5.3 of FIG. 5A. As illustrated, this information may be saved to the 3D reconstruction database to update the 3D model.

At operation S5.24 the new positions and orientations of the real cameras may be determined. This operation may be performed in the same or a similar way to operation S5.4 of FIG. 5A. As illustrated, this may be performed using information read from the camera position and orientation database. Also as illustrated, the newly determined positions and orientations may be saved to the camera position and orientation database to update the camera position and orientation database.

It will be appreciated that operations S5.21 and 5.24 may be repeated if the arrangement of the multi-directional image capture apparatuses changes again (for instance, if the apparatus is moving within the environment), in order to continue to update the 3D reconstruction database and the camera position and orientation database. In some examples, operations S5.21 to S5.24 may be performed periodically or in response to the detection of a change. For example, operations S5.21 to S5.24 may be performed in response to movement of a multi-directional image capture apparatus or the appearance of a new multi-directional image capture apparatus in the system.

Figure 6:
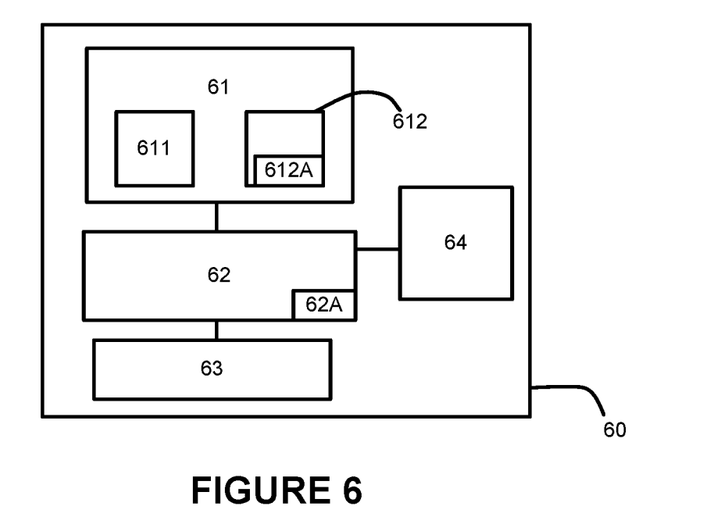
FIG. 6 is a schematic diagram of an example configuration of computing apparatus configured to perform various operations described herein.

FIG. 6 is a schematic block diagram of an example configuration of computing apparatus 60, which may be configured to perform any of or any combination of the operations described herein. The computing apparatus 60 may comprise memory 61, processing circuitry 62, an input 63, and an output 64.

The processing circuitry 62 may be of any suitable composition and may include one or more processors 62A of any suitable type or suitable combination of types. For example, the processing circuitry 62 may be a programmable processor that interprets computer program instructions and processes data. The processing circuitry 62 may include plural programmable processors. Alternatively, the processing circuitry 62 may be, for example, programmable hardware with embedded firmware. The processing circuitry 62 may be termed processing means. The processing circuitry 62 may alternatively or additionally include one or more Application Specific Integrated Circuits (ASICs). In some instances, processing circuitry 62 may be referred to as computing apparatus.

The processing circuitry 62 described with reference to FIG. 6 is coupled to the memory 61 (or one or more storage devices) and is operable to read/write data to/from the memory. The memory 61 may store thereon computer readable instructions 612A which, when executed by the processing circuitry 62, may cause any one of or any combination of the operations described herein to be performed. In some examples, various other data, such as the 3D reconstruction database and/or camera position and orientation database of FIG. 5B, may also be stored in the memory 61.

The memory 61 may comprise a single memory unit or a plurality of memory units upon which the computer-readable instructions (or code) 612A is stored. For example, the memory 61 may comprise both volatile memory 611 and non-volatile memory 612. For example, the computer readable instructions 612A may be stored in the non-volatile memory 612 and may be executed by the processing circuitry 62 using the volatile memory 611 for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories 61 in general may be referred to as non-transitory computer readable memory media.

The input 63 may be configured to receive image data representing the first images 21 described herein. The image data may be received, for instance, from the multi-directional image capture apparatus 10 itself or may be received from a storage device. The output may be configured to output any of or any combination of the camera pose registration information described herein. The structural elements of FIG. 6 represent examples of means for performing one or more or any combination of the operations described herein. For example, computing apparatus 60 may comprise means for performing one or more steps of the methods as described in the claims and throughout the specification.

Figure 7:
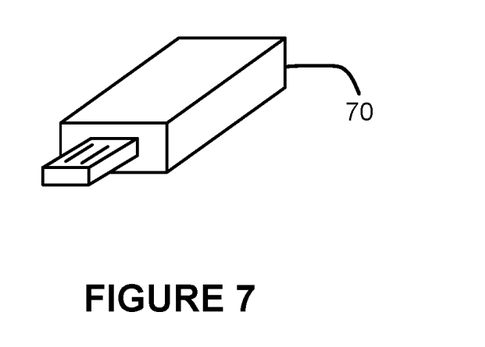
FIG. 7 illustrates an example of a computer-readable storage medium with computer readable instructions stored thereon.

FIG. 7 illustrates an example of a computer-readable medium 70 with computer-readable instructions (code) stored thereon. The computer-readable instructions (code), when executed by a processor, may cause any one of or any combination of the operations described above to be performed.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 5 is an example only and that various operations depicted therein may be omitted, reordered and/or combined. For example, it will be appreciated that operation S5.6 as illustrated in FIG. 5 may be omitted.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
in response to a movement of a first multi-directional image capture apparatus to a changed position:
performing image re-projection on a plurality of first images of a scene to generate a plurality of re-projected second images of the scene, wherein each first image of the scene is captured by a respective camera of the first multi-directional image capture apparatus and each second image of the scene is associated with a respective virtual camera of a plurality of virtual cameras;
processing the plurality of re-projected second images based on a previously generated virtual three dimensional model of the scene to generate respective positions of the virtual cameras associated with the second images; and
determining a new position of the first multi-directional image capture apparatus based on both the movement of the first multi-directional image capture apparatus and on one or more of the generated respective positions of the virtual cameras, wherein the new position corresponds to the changed position of the first multi-directional image capture apparatus;
wherein determining the new position of the first multi-directional image capture apparatus based on one or more of the generated positions of the virtual cameras comprises:
determining inliers in the generated respective positions of the virtual cameras; and
determining the new position of the first multi-directional image capture apparatus based on the inliers;
wherein the new position of the first multi-directional image capture apparatus is determined as a position vector of the first multi-directional image capture apparatus in a reference coordinate system, wherein the position vector of the first multi-directional image capture apparatus in the reference coordinate system is determined by taking a difference between a position vector of at least one camera and a position vector of the at least one camera relative to the first multi-directional image capture apparatus.

2. The method of claim 1, further comprising updating the previously generated virtual three dimensional model with the determined new position of the first multi-directional image capture apparatus.

3. The method of claim 1, wherein the previously generated virtual three dimensional model comprises information describing features of the scene.

4. The method of claim 1, wherein the previously generated three dimensional model is generated based at least in part on images previously captured by the first multi-directional image capture apparatus; or images previously captured by a set of one or more multi-directional image capture apparatuses which does not include the first multi-directional image capture apparatus.

5. The method of claim 1, wherein processing the plurality of re-projected second images based on the previously generated virtual three dimensional model comprises:
determining point correspondences between the re-projected second images and the previously generated virtual three dimensional model; and
performing a Direct Linear Transform based on the determined point correspondences to determine positions of the virtual cameras.

6. The method of claim 1, wherein determining the new position of the first multi-directional image capture apparatus based on the generated respective positions of the virtual cameras comprises:
determining a position of a camera of the first multi-directional image capture apparatus based on one or more of the generated positions of the virtual cameras; and
determining the new position of the first multi-directional image capture apparatus based on the determined position of the camera.

7. The method of claim 1, wherein determining the new position of the first multi-directional image capture apparatus based on one or more of the generated positions of the virtual cameras further comprises:
selecting a virtual camera from among the plurality of virtual cameras based on a smallest re-projection error associated therewith; and
determining the new position of the first multi-directional image capture apparatus based only on the position of the virtual camera selected based on the smallest re-projection error associated therewith.

8. The method of claim 1, wherein the processing of the plurality of re-projected second images further generates respective orientations of the virtual cameras, and the method further comprises:
determining an orientation of the first multi-directional image capture apparatus based on one or more of the generated respective orientations of the virtual cameras.

9. An apparatus comprising:
at least one processor; and
at least one memory including computer program code, which when executed by the at least one processor, causes the apparatus to:
in response to a movement of a first multi-directional image capture apparatus to a changed position:
perform image re-projection on a plurality of first images of a scene to generate a plurality of re-projected second images of the scene, wherein each first image of the scene is captured by a respective camera of the first multi-directional image capture apparatus and each second image of the scene is associated with a respective virtual camera of a plurality of virtual cameras;

process the plurality of re-projected second images based on a previously generated virtual three dimensional model of the scene to generate respective positions of the virtual cameras associated with the second images; and determine a new position of the first multi-directional image capture apparatus based on both the movement of the first multi-directional image capture apparatus and on one or more of the generated respective positions of the virtual cameras, wherein the new position corresponds to the changed position of the first multi-directional image capture apparatus;

wherein to determine the new position of the first multi-directional image capture apparatus based on one or more of the generated positions of the virtual cameras, the apparatus is further caused to:

determine inliers in the generated respective positions of the virtual cameras; and determine the new position of the first multi-directional image capture apparatus based on the inliers;

wherein the new position of the first multi-directional image capture apparatus is determined as a position vector of the first multi-directional image capture apparatus in a reference coordinate system, wherein the position vector of the first multi-directional image capture apparatus in the reference coordinate system is determined by taking a difference between a position vector of at least one camera and a position vector of the at least one camera relative to the first multi-directional image capture apparatus.

10. The apparatus of claim 9, wherein the computer program code, which when executed by the at least one processor, further causes the apparatus to:

update the previously generated virtual three dimensional model with the determined new position of the first multi-directional image capture apparatus.

11. The apparatus of claim 9, wherein the previously generated virtual three dimensional model comprises information describing features of the scene.

12. The apparatus of claim 9, wherein the previously generated three dimensional model is generated based at least in part on images previously captured by the first multi-directional image capture apparatus; or images previously captured by a set of one or more multi-directional image capture apparatuses which does not include the first multi-directional image capture apparatus.

13. The apparatus of claim 9, wherein to process the plurality of second images based on the virtual three dimensional model, the apparatus is further caused to:

determine point correspondences between the re-projected second images and the previously generated virtual three dimensional model; and perform a Direct Linear Transform based on the determined point correspondences to determine positions of the virtual cameras.

14. The apparatus of claim 9, wherein to determine the new position of the first multi-directional image capture apparatus based on the generated positions of the virtual cameras, the apparatus is further caused to:

determine a position of a camera of the first multi-directional image capture apparatus based on one or more of the generated positions of the virtual cameras; and determine the new position of the first multi-directional image capture apparatus based on the determined position of the camera.

15. The apparatus of claim 9, wherein to determine the new position of the first multi-directional image capture apparatus based on one or more of the generated positions of the virtual cameras, the apparatus is further caused to:

select a virtual camera from among the plurality of virtual cameras based on a smallest re-projection error associated therewith; and determine the new position of the multi-directional image capture apparatus based only on the position of the virtual camera selected based on the smallest re-projection error associated therewith.

16. A non-transitory computer-readable medium having computer-readable code stored thereon, the computer readable code, when executed by at least one processor, causes an apparatus to:

in response to a movement of a first multi-directional image capture apparatus to a changed position:

performing image re-projection on a plurality of first images of a scene to generate a plurality of re-projected second images of the scene, wherein each first image of the scene is captured by a respective camera of the first multi-directional image capture apparatus and each second image of the scene is associated with a respective virtual camera of a plurality of virtual cameras;

processing the plurality of re-projected second images based on a previously generated virtual three dimensional model of the scene to generate respective positions of the virtual cameras associated with the second images; and determining a new position of the first multi-directional image capture apparatus based on both the movement of the first multi-directional image capture apparatus and on one or more of the generated respective positions of the virtual cameras, wherein the new position corresponds to the changed position of the first multi-directional image capture apparatus;

wherein determining the new position of the first multi-directional image capture apparatus based on one or more of the generated positions of the virtual cameras comprises:

determining inliers in the generated respective positions of the virtual cameras; and determining the new position of the first multi-directional image capture apparatus based on the inliers;

wherein the new position of the first multi-directional image capture apparatus is determined as a position vector of the first multi-directional image capture apparatus in a reference coordinate system, wherein the position vector of the first multi-directional image capture apparatus in the reference coordinate system is determined by taking a difference between a position vector of at least one camera and a position vector of the at least one camera relative to the first multi-directional image capture apparatus.

17. The method of claim 1, wherein the changed position of the first multi-directional image capture apparatus corresponds to an addition of the first multi-directional image capture apparatus to an arrangement of one or more other multi-directional image capture apparatuses.

\* \* \* \* \*